(12) United States Patent
Liu et al.

(10) Patent No.: US 10,925,073 B2
(45) Date of Patent: Feb. 16, 2021

(54) RADIO COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Jianhua Liu, Dongguan (CN); Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/479,774

(22) PCT Filed: Jan. 23, 2017

(86) PCT No.: PCT/CN2017/072287
§ 371 (c)(1),
(2) Date: Jul. 22, 2019

(87) PCT Pub. No.: WO2018/133126
PCT Pub. Date: Jul. 26, 2018

(65) Prior Publication Data
US 2019/0373619 A1   Dec. 5, 2019

(51) Int. Cl.
*H04W 72/08* (2009.01)
*H04W 8/08* (2009.01)
(Continued)

(52) U.S. Cl.
CPC .......... *H04W 72/087* (2013.01); *H04W 8/08* (2013.01); *H04W 52/325* (2013.01); *H04W 52/367* (2013.01)

(58) Field of Classification Search
None
See application file for complete search history.

(56) References Cited

U.S. PATENT DOCUMENTS 9,648,639 B2 * 5/2017 McCoy ............. H04W 72/1284
9,787,427 B2 * 10/2017 Futagi ................. H04L 1/0021
(Continued)

FOREIGN PATENT DOCUMENTS

| CN | 103533533 A | 1/2014 |
|---|---|---|
| CN | 104838713 A | 8/2015 |

(Continued)

OTHER PUBLICATIONS

English translation of the Written Opinion of the International Search Authority in the international application No. PCT/CN2017/072287, dated Sep. 28, 2017.
(Continued)

*Primary Examiner* — Hong S Cho

(57) ABSTRACT

Embodiments of the present application allow a terminal device to determine a transmission format via a non-scheduling means and implement license-free transmission. Provided are a radio communication method, a terminal device, and a network device. The method comprises: a terminal device determines a first transmission format used for transmitting data to be transmitted; according to the first transmission format, the terminal device transmits to a network device the data to be transmitted.

19 Claims, 3 Drawing Sheets

(51) Int. Cl.
*H04W 52/32* (2009.01)
*H04W 52/36* (2009.01)

(56) References Cited

U.S. PATENT DOCUMENTS

| | | |
|---|---|---|
| 2006/0034165 A1 | 2/2006 | Levy |
| 2007/0054689 A1* | 3/2007 | Baker .................. H04W 52/08 455/522 |
| 2012/0218925 A1* | 8/2012 | Loh ..................... H04B 7/0623 370/310 |
| 2013/0315336 A1 | 11/2013 | Levy |
| 2014/0192767 A1 | 7/2014 | Au et al. |
| 2014/0254544 A1 | 9/2014 | Kar Kin Au et al. |
| 2015/0030095 A1 | 1/2015 | Levy |
| 2015/0173113 A1 | 6/2015 | Liu et al. |
| 2015/0200746 A1 | 7/2015 | Pan et al. |
| 2016/0087699 A1 | 3/2016 | Levy |
| 2016/0323911 A1 | 11/2016 | Au et al. |
| 2016/0353436 A1 | 12/2016 | Au et al. |
| 2016/0380712 A1 | 12/2016 | Levy |
| 2017/0012735 A1* | 1/2017 | Yang .................... H04L 1/0016 |
| 2017/0063503 A1* | 3/2017 | Liu ...................... H04L 5/0094 |

FOREIGN PATENT DOCUMENTS

| | | |
|---|---|---|
| CN | 105284172 A | 1/2016 |
| CN | 105916171 A | 8/2016 |
| EP | 1779702 B1 | 9/2012 |
| EP | 2879427 A1 | 6/2015 |
| RU | 2514089 C2 | 4/2014 |
| WO | 2016119651 A1 | 8/2016 |
| WO | 2016196036 A1 | 12/2016 |

OTHER PUBLICATIONS

Supplementary European Search Report in the European application No. 17893311.5, dated Sep. 27, 2019.
International Search Report in the internationai application No. PCT/CN 2017/072287, dated Sep. 28, 2017.
Written Opinion of the International Search Authority in the international application No. PCT/CN 2017/072287, dated Sep. 28, 2017.
First Office Action of the Russian application No. 2019126150, dated Apr. 15, 2020.
First Office Action of the European application No. 17893311.5, dated Dec. 11, 2020.
Second Office Action of the Russian application No. 2019126150, dated Oct. 21, 2020.

* cited by examiner

RADIO COMMUNICATION METHOD, TERMINAL DEVICE, AND NETWORK DEVICE

TECHNICAL FIELD

The disclosure relates to the field of communication, and in particular to a wireless communication method, a terminal device and a network device.

BACKGROUND

In a typical wireless communication network (such as a Long Term Evolution (abbreviated as "LTE") network), selection of uplink shared data channels is based on a scheduling/grant mechanism and is completely controlled by a Base Station (abbreviated as "BS"). In this mechanism, User Equipment (abbreviated as "UE") first sends an uplink scheduling request to the BS. After the request is received, the BS sends an uplink Grant to the UE to notify the UE of uplink transmission resources allocated to the UE. Then, the UE performs data transmission on the granted uplink transmission resources.

Large-scale user access is one of typical application scenarios in a next generation of communication network. When massive users are accessed, usage of the above scheduling/grant mechanism will cause, on one hand, the huge signaling transmission overhead and the scheduling pressure of the BS for resource allocation and on the other hand, the significant transmission delay. In view of this, a grant free transmission manner will be employed by the next generation of communication network to support the access of the massive users.

Therefore, implementation of grant free transmission is an urgent problem to be solved.

SUMMARY

The embodiments of the disclosure provide a wireless communication method, a terminal device and a network device, which can achieve determination of a transmission format in a non-scheduling manner by the terminal device and implement the grant free transmission.

A first aspect provides a wireless communication method, which may include the following operations.

A terminal device determines a first transmission format for sending data to be sent.

The terminal device sends the data to be sent to a network device according to the first transmission format.

In combination with the first aspect, in a possible implementation manner of the first aspect, the first transmission format includes at least one of the followings: a first modulation manner, a first code rate, a first transport block size (TBS), a first modulation coding level or a first physical resource block (PRB) size.

In combination with the first aspect or any possible implementation manner thereof, in another possible implementation manner of the first aspect, the method may further include the following operation.

The terminal device sends first indication information to the network device, and the first indication information is to indicate the first transmission format.

In combination with the first aspect or any possible implementation manner thereof, in another possible implementation manner of the first aspect, the operation that the terminal device sends first indication information to the network device may include the following action.

The terminal device sends the first indication information to the network device via a data channel for transmission of the data to be sent.

In combination with the first aspect or any possible implementation manner thereof, in another possible implementation manner of the first aspect, the operation that the terminal device sends first indication information to the network device may include the following action.

The terminal device sends the first indication information to the network device on a pre-configured resource for transmission of indication information of a transmission format.

In combination with the first aspect or any possible implementation manner thereof, in another possible implementation manner of the first aspect, the pre-configured resource is a dedicated resource of the terminal device.

Alternatively, the pre-configured resource is a resource shared by multiple terminal devices, and the indication information further carries an identifier of the terminal device.

In combination with the first aspect or any possible implementation manner thereof, in another possible implementation manner of the first aspect, the operation that the terminal device determines a first transmission format for sending data to be sent may include the following action.

The terminal device determines the first transmission format for sending the data according to at least one of the followings:
pre-configured multiple transmission formats;
a data amount of the data to be sent;
a present downlink quality;
a Quality of Service (QoS) requirement of the data to be sent;
a bearer of the data to be sent;
a data stream of the data to be sent;
a pre-configured position of an uplink available resource;
a pre-configured size of an uplink available resource, a pre-configured reference code rate, and the number of bits capable of being carried by a unit uplink resource; or
a maximum available transmit power of the terminal device for transmission of the data to be sent.

In combination with the first aspect or any possible implementation manner thereof, in another possible implementation manner of the first aspect, the operation that the terminal device determines a first transmission format for sending data to be sent may include the following action.

At least one TBS is determined according to pre-configured multiple TBSs and the data amount of the data to be sent. The at least one TBS is a TBS, more than the data amount of the data to be sent, in the multiple TBSs.

A minimum TBS of the at least one TBS is determined as a first TBS included in the first transmission format.

In combination with the first aspect or any possible implementation manner thereof, in another possible implementation manner of the first aspect, the operation that a terminal device determines a first transmission format for sending data to be sent may include the following action.

At least one TBS is determined according to pre-configured multiple TBSs and the data amount of the data to be sent. The at least one TBS is a TBS, less than the data amount of the data to be sent, in the multiple TBSs.

A maximum TBS of the at least one TBS is determined as a first TBS included in the first transmission format.

In combination with the first aspect or any possible implementation manner thereof, in another possible implementation manner of the first aspect, the operation that the terminal device determines a first transmission format for sending data to be sent may include the following action.

A first TBS included in the first transmission format is determined according to the pre-configured size of the uplink available resource, the pre-configured reference code rate, and the number of bits capable of being carried by the unit uplink resource.

In combination with the first aspect or any possible implementation manner thereof, in another possible implementation manner of the first aspect, the operation that the terminal device determines a first transmission format for sending data to be sent may include the following actions.

A first TBS included in the first transmission format is determined.

A transmit power corresponding to each of the pre-configured multiple modulation manners is calculated according to the first TBS.

A first modulation manner or a first modulation coding level included in the first transmission format is determined according to the transmit power corresponding to each modulation manner.

In combination with the first aspect or any possible implementation manner thereof, in another possible implementation manner of the first aspect, a transmit power corresponding to the first modulation manner or a modulation manner included in the first modulation coding level is a minimum transmit power of transmit powers corresponding to the multiple modulation manners; and/or, the transmit power corresponding to the first modulation manner or the modulation manner included in the first modulation coding level is less than a maximum available transmit power of the terminal device for transmission of the data to be sent.

In combination with the first aspect or any possible implementation manner thereof, in another possible implementation manner of the first aspect, the number of bits capable of being carried by the unit uplink resource includes the number of bits capable of being carried by a unit uplink resource corresponding to each of the multiple modulation manners.

The operation that the terminal device determines a first transmission format for sending data to be sent may include the following actions.

A TBS corresponding to each modulation manner is determined according to the size of the uplink available resource, the reference code rate and the number of bits capable of being carried by a unit uplink resource corresponding to each modulation manner.

According to TBSs corresponding to the multiple modulation manners, a first TBS included in the first transmission format is determined, and a first modulation manner or a first modulation coding level included in the first transmission format is determined.

In combination with the first aspect or any possible implementation manner thereof, in another possible implementation manner of the first aspect, the operation that a first TBS included in the first transmission format is determined, and a first modulation manner or a first modulation coding level included in the first transmission format is determined may include the following actions.

A maximum TBS of the TBSs corresponding to the multiple modulation manners is determined as the first TBS.

A modulation manner corresponding to the first TBS is determined as the first modulation manner, or a modulation coding level to which the modulation manner corresponding to the first TBS belongs is determined as the first modulation coding level.

In combination with the first aspect or any possible implementation manner thereof, in another possible implementation manner of the first aspect, the operation that a first TBS included in the first transmission format is determined, and a first modulation manner or a first modulation coding level included in the first transmission format is determined may include the following actions.

At least one TBS, more than the data amount of the data to be sent, is determined from the TBSs corresponding to the multiple modulation manners.

A minimum TBS of the at least one TBS is determined as the first TBS.

A modulation manner corresponding to the first TBS is determined as the first modulation manner, or a modulation coding level to which the modulation manner corresponding to the first TBS belongs is determined as the first modulation coding level.

In combination with the first aspect or any possible implementation manner thereof, in another possible implementation manner of the first aspect, the operation that a first TBS included in the first transmission format is determined, and a first modulation manner or a first modulation coding level included in the first transmission format is determined may include the following actions.

A transmit power at a TBS corresponding to each modulation manner is calculated.

According to the transmit power at the TBS corresponding to each modulation manner, the first TBS is determined, and the first modulation manner or the first modulation coding level is determined.

In combination with the first aspect or any possible implementation manner thereof, in another possible implementation manner of the first aspect, a transmit power corresponding to the first modulation manner or a modulation manner included in the first modulation coding level is a minimum transmit power of transmit powers corresponding to the multiple modulation manners; and/or, the transmit power corresponding to the first modulation manner or the modulation manner included in the first modulation coding level is less than a maximum available transmit power of the terminal device for transmission of the data to be sent.

In combination with the first aspect or any possible implementation manner thereof, in another possible implementation manner of the first aspect, the operation that the first TBS and the first modulation manner are determined according to the transmit power at the TBS corresponding to each modulation manner may include the following action.

According to the transmit power at the TBS corresponding to each modulation manner and the TBS corresponding to each modulation manner, the first TBS is determined, and the first modulation manner or the first modulation coding level is determined.

In combination with the first aspect or any possible implementation manner thereof, in another possible implementation manner of the first aspect, the operation that the terminal device determines a first transmission format for sending data to be sent may include the following action.

The terminal device determines the first transmission format according to a present downlink quality and a first correspondence. The first correspondence is to indicate a correspondence between multiple transmission formats and multiple downlink quality ranges.

In combination with the first aspect or any possible implementation manner thereof, in another possible implementation manner of the first aspect, the operation that the terminal device determines a first transmission format for sending data to be sent may include the following action.

The terminal device determines the first transmission format according to a data stream of the data to be sent and a second correspondence. The second correspondence is to indicate a correspondence between multiple transmission formats and multiple data streams.

In combination with the first aspect or any possible implementation manner thereof, in another possible implementation manner of the first aspect, the operation that the terminal device determines a first transmission format for sending data to be sent may include the following action.

The terminal device determines the first transmission format according to a bearer of the data to be sent and a third correspondence. The third correspondence is to indicate a correspondence between multiple transmission formats and multiple bearers.

In combination with the first aspect or any possible implementation manner thereof, in another possible implementation manner of the first aspect, the operation that the terminal device determines a first transmission format may include the following action.

The terminal device determines the first transmission format according to a pre-configured position of the available resource for transmitting uplink data and a fourth correspondence. The fourth correspondence is to indicate a correspondence between multiple transmission formats and multiple position ranges of uplink resources.

In combination with the first aspect or any possible implementation manner thereof, in another possible implementation manner of the first aspect, the operation that the terminal device determines a first transmission format may include the following action.

The terminal device determines the first transmission format according to a QoS requirement of the data to be sent and a QoS requirement capable of being met by each of the multiple transmission formats.

In combination with the first aspect or any possible implementation manner thereof, in another possible implementation manner of the first aspect, the method may further include the following operation.

The terminal device receives configuration information of the network device. The configuration information is used for indicating at least one of the followings:
the pre-configured multiple transmission formats;
the pre-configured position of the uplink available resource;
the pre-configured size of the uplink available resource; or
the pre-configured reference code rate of the uplink data.

In combination with the first aspect or any possible implementation manner thereof, in another possible implementation manner of the first aspect, the operation that the terminal device receives configuration information of the network device may include the following action.

The terminal device receives the configuration information sent by the network device via Wireless Resource Control (RRC) layer signaling, Media Access Control (MAC) layer signaling or physical layer signaling.

In combination with the first aspect or any possible implementation manner thereof, in another possible implementation manner of the first aspect, the method is used in grant free transmission.

In combination with the first aspect or any possible implementation manner thereof, in another possible implementation manner of the first aspect, the method is used in a terminal device in an inactive state.

A second aspect provides a wireless communication method, which may include the following operations.

A network device determines a first transmission format for receiving data to be received.

The network device receives the data to be received sent by a terminal device according to the first transmission format.

In combination with the second aspect, in a possible implementation manner of the second aspect, the first transmission format includes at least one of the followings: a first modulation manner, a first code rate, a first TBS, a first modulation coding level or a first PRB size.

In combination with the second aspect or any possible implementation manner thereof, in another possible implementation manner of the second aspect, the method may further include the following operation.

The network device receives first indication information sent by the terminal device. The first indication information is to indicate the first transmission format.

The operation that the network device determines a first transmission format for receiving data to be received may include the following action.

The network device determines the first transmission format according to the first indication information.

In combination with the second aspect or any possible implementation manner thereof, in another possible implementation manner of the second aspect, the operation that the network device receives first indication information sent by the terminal device may include the following action.

The network device receives the first indication information sent by the terminal device via a data channel for transmission of the data to be received.

In combination with the second aspect or any possible implementation manner thereof, in another possible implementation manner of the second aspect, the operation that the network device receives first indication information sent by the terminal device may include the following action.

The network device receives the first indication information sent by the terminal device on a pre-configured resource for transmission of indication information of a transmission format.

In combination with the second aspect or any possible implementation manner thereof, in another possible implementation manner of the second aspect, the pre-configured resource is a dedicated resource of the terminal device.

Alternatively, the pre-configured resource is a resource shared by multiple terminal devices, and the indication information further carries an identifier of the terminal device.

In combination with the second aspect or any possible implementation manner thereof, in another possible implementation manner of the second aspect, the method may further include the following operation.

The network device sends configuration information, to enable a receiver to select a transmission format for transmitting uplink data. The receiver includes the terminal device, and the configuration information is to indicate at least one of the followings:
pre-configured multiple transmission formats;
a pre-configured position of an uplink available resource;
a pre-configured size of the uplink available resource; or
a pre-configured reference code rate of the uplink data.

In combination with the second aspect or any possible implementation manner thereof, in another possible implementation manner of the second aspect, the method is used in grant free transmission.

In combination with the second aspect or any possible implementation manner thereof, in another possible implementation manner of the second aspect, the terminal device is a terminal device in an inactive state.

A third aspect provides a terminal device. The terminal device may include a unit for executing the method in the first aspect or any possible implementation manner thereof.

A fourth aspect provides a network device. The network device may include a unit for executing the method in the second aspect or any possible implementation manner thereof.

A fifth aspect provides a terminal device, which may include a memory and a processor. The memory stores an instruction. The processor is configured to invoke the instruction stored in the memory to execute the method in the first aspect or any possible implementation manner thereof.

A sixth aspect provides a network device, which may include a memory and a processor. The memory stores an instruction. The processor is configured to invoke the instruction stored in the memory to execute the method in the second aspect or any possible implementation manner thereof.

A seventh aspect provides a computer-readable medium. The computer-readable medium stores a program code executed by a terminal device. The program code includes an instruction for executing the method in the first aspect or various implementation manners, or includes an instruction for executing the method in the second aspect or various implementation manner.

An eighth aspect provides a system chip. The system chip includes an input interface, an output interface, a processor and a memory. The processor is configured to execute a code in the memory. When the code is executed, the processor may implement the method in the first aspect or various implementation manners, or the processor may implement the method in the second aspect or various implementation manners.

BRIEF DESCRIPTION OF DRAWINGS

In order to describe the technical solutions in the embodiments of the disclosure more clearly, the drawings required to be used in descriptions about the embodiments or a conventional art will be simply introduced below. It is apparent that the drawings described below are only some embodiments of the disclosure. Other drawings may further be obtained by those of ordinary skill in the art according to these drawings without creative work.

DETAILED DESCRIPTION

Figure 1:
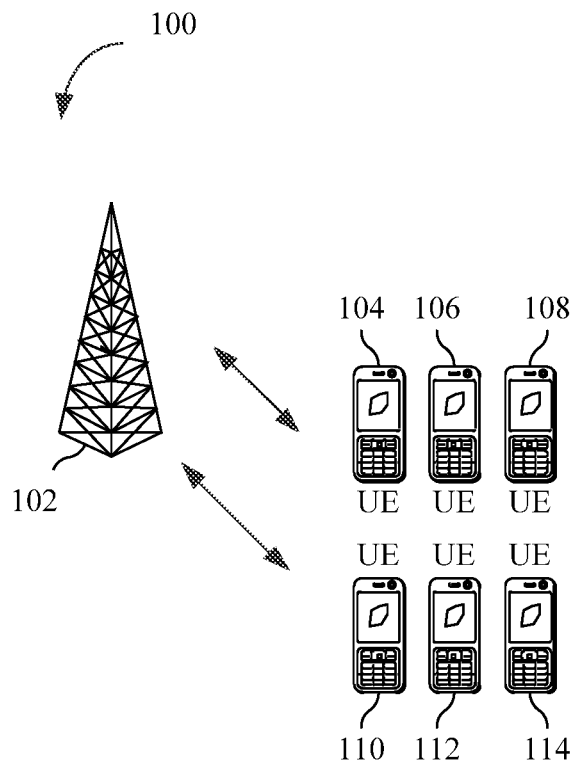
FIG. 1 illustrates a schematic diagram of a wireless communication system according to an embodiment of the disclosure.

The technical solutions in the embodiments of the disclosure will be described below in combination with the accompanying drawings in the embodiments of the disclosure. It is apparent that the embodiments described below are not all embodiments but part of embodiments of the disclosure. All other embodiments obtained by those of ordinary skill in the art based on the embodiments in the disclosure without creative work shall fall within the scope of protection of the disclosure.

The terms "component", "module", "system" and the like are used herein for indicating a computer associated entity, hardware, firmware, hardware, a combination of hardware and software, software or software being executed. For example, the component may be, but not limited to, a progress run on a processor, a processor, an object, an executable file, a thread of execution, a program, and/or a computer. By way of illustration, both an application run on a computing device and the computing device may be the components. One or more components may reside within a process and/or thread of execution and a component may be localized on one computer and/or distributed between two or more computers. Besides, these components may be executed from various computer readable media storing various data structures thereon. The components may be, for example, communicated via a local and/or remote progress according to a signal having one or more data packets (for example, data from two components interacted with another component of a local system, a distributive system and/or a network, and for example, an internet interacted with other systems via a signal).

The technical solutions in the embodiments of the disclosure may be applied in various communications systems, such as a Global System of Mobile communication (abbreviated as "GSM") system, a Code Division Multiple Access (abbreviated as "CDMA") system, a Wideband Code Division Multiple Access (abbreviated as "WCDMA") system, a Long Term Evolution (abbreviated as "LTE") system, an LTE Frequency Division Duplex (abbreviated as "FDD") system, an LTE Time Division Duplex (abbreviated as "TDD") system, a Universal Mobile Telecommunication System (abbreviated as "UMTS") system and a future 5G communication system, etc.

Each embodiment is described in the disclosure in combination with a terminal device. The terminal device may also be User Equipment (abbreviated as "UE"), an access terminal, a user unit, a user station, a mobile station, a mobile platform, a remote station, a remote terminal, a mobile device, a user terminal, a terminal, a wireless communication device and a user proxy or user apparatus. The access terminal may be a cellular phone, a cordless telephone, a Session Initiation Protocol (abbreviated as "SIP") phone, a Wireless Local Loop (abbreviated as "WLL") station, a Personal Digital Assistant (abbreviated as "PDA"), a handheld device having a wireless communication function, a computing device or other processing devices connected to a wireless modem, vehicle-mounted devices and wearable devices, a terminal device in a future 5G network or a terminal device in a future evolved Public Land Mobile Network (PLMN) network, etc.

Each embodiment is described in the disclosure in combination with a network device. The network device may be a device used for communicating with the terminal device, and may be, for example, a Base Transceiver Station (abbreviated as "BTS") in a GSM or CDMA, may also be a NodeB (abbreviated as "NB") in a WCDMA system, and may further be an Evolutional NodeB (abbreviated as "eNB" or "eNodeB") in an LTE system; or the network device may be a relay station, an access point, a vehicle-mounted device, a wearable device, a network side device in the future 5G system or a network side device in the future evolved PLMN network, etc.

Due to a great number of connections, there is a significant difference between a future wireless communication system and an existing communication system. The great number of connections need more resources to access a UE and more resources to transmit scheduling signaling relevant to data transmission of the terminal device.

FIG. 1 illustrates a schematic architecture diagram of a wireless communication system according to an embodiment of the disclosure. As illustrated in FIG. 1, the wireless communication system 100 may include a network device 102 and terminal devices 104-114 (abbreviated as UEs in FIG. 1), which are connected via a wireless connection or a wired connection or other manners.

The network in this embodiment of the disclosure may be a Public Land Mobile Network (abbreviated as "PLMN") or a Device to Device (D2D) network or a Machine to Machine/Man (M2M) network or other networks. FIG. 1 is a simplified schematic diagram for example. The network may further include other network devices, which is not illustrated in FIG. 1.

The disclosure provides a solution of grant free transmission. The grant free transmission may be applied for a lot of MTC services in a future network, and meet the requirement of the service transmission on low time delay and high reliability. The grant free transmission may be directed for uplink data transmission. It is known by those skilled in the art that the grant free transmission may also be referred to other names such as spontaneous access. The UL grant free transmission may be understood as any one of the following meanings, or multiple meanings, or a combination of a part of technical features in the multiple meanings.

1. The grant free transmission may indicate that multiple transmission resources are pre-allocated by a network device and are notified to a terminal device; when the terminal device needs to perform an uplink data transmission, the terminal device selects at least one transmission resource from the multiple transmission resources pre-allocated by the network device, and perform transmission of uplink data via the selected transmission resource. The network device detects the uplink data sent by the terminal device on one or more transmission resources of the multiple transmission resources pre-allocated by the network device. The detection may be a blind detection, and may also be performed according to a control domain in the uplink data, or performed in other manners.

2. The grant free transmission may indicate that multiple transmission resources are pre-allocated by a network device and are notified to a terminal device, such that when the terminal device needs to perform an uplink data transmission, the terminal device selects at least one transmission resource from the multiple transmission resources pre-allocated by the network device, and perform transmission of uplink data via the selected transmission resource.

3. The grant free transmission may indicate that information on multiple transmission resources pre-allocated is acquired; and when an uplink data transmission is required, at least one transmission resource is selected from the multiple transmission resources, and the selected transmission resource is used to send the uplink data. The information may be acquired from a network device.

4. The grant free transmission may indicate a method that can implement uplink data transmission of a terminal device without dynamic scheduling of a network device. The dynamic scheduling may refer to a scheduling manner in which the network device instructs a transmission resource for the terminal device via signaling at each time of uplink data transmission. In at least one example, the uplink data transmission of the terminal device may be understood as uplink data transmission that data of two or more terminal devices are allowed to be transmitted on a same time-frequency resource. In at least one example, the transmission resource may be a transmission resource within one or more transmission time units after the time when the UE receives the signaling. Each of the transmission time units may be a minimum time unit for transmission at one time such as a Transmission Time Interval (abbreviated as "TTI"), with a value of 1 ms, or may be a preset transmission time unit 5. The grant free transmission may indicate uplink data transmission of a terminal device without a grant of a network device. The grant may refer to that the terminal device sends an uplink scheduling request to the network device, and upon the reception of the scheduling request, the network device sends an uplink grant to the terminal device. The uplink grant indicates one or more uplink transmission resources allocated to the terminal device.

6. The grant free transmission may indicate a contention transmission manner. Specifically, it may refer to that multiple terminals perform uplink data transmission simultaneously on same time frequency resources allocated in advance without a grant of a BS.

The data may include service data or signaling data.

The blind detection may be understood as detection performed on data that is possibly reached, without knowing whether the data are reached. The blind detection may also be understood as detection without the indication of explicit signaling.

The transmission resource may include, but not limited to, one or more combinations of the following resources: a time-domain resource, such as a wireless frame, a subframe and a symbol; a frequency-domain resource, such as a sub-carrier and a resource block; a space-domain resource, such as a transmitting antenna and a beam; a code-domain resource, such as a Sparse Code Multiple Access (abbreviated as "SCMA") code group, a Low Density Signature (abbreviated as "LDS") group and a CDMA code group; and an uplink pilot frequency resource.

The above-mentioned transmission resource may be transmitted according to a control mechanism including but not limited to the followings: uplink power control, such as upper limit control of an uplink transmit power; Modulation Coding Scheme (MCS) setting, such as Transport Block Size (TBS), code rate and modulation order setting; and a retransmission mechanism, such as a Hybrid Automatic Retransmission Request (HARQ) mechanism.

The embodiment in FIG. 1 is described with the example in which the network device is a base station. The network device may also be other access devices (such as a wireless access point).

In order to understand the disclosure more clearly, the solutions according the embodiments of the disclosure will be described below in combination with FIG. 2 to FIG. 7.

Figure 2:
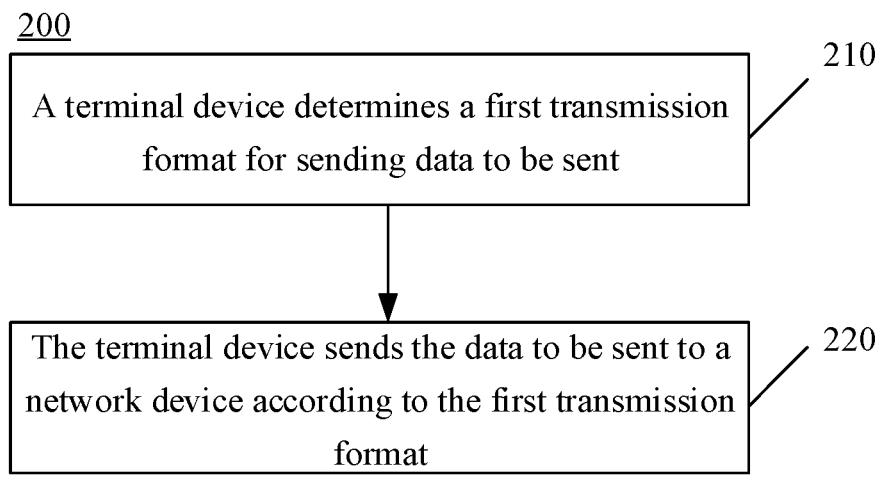
FIG. 2 illustrates a schematic flowchart diagram of a wireless communication method according to an embodiment of the disclosure.

FIG. 2 illustrates a schematic flowchart of a wireless communication method 200 according to an embodiment of the disclosure. In at least one embodiment, the method 200 is applied in the grant free transmission.

As illustrated in FIG. 2, the method 200 may include the following operations.

At 210, a terminal device determines a first transmission format for sending data to be sent.

In at least one embodiment, the first transmission format includes at least one of the followings: a first modulation manner, a first code rate, a first TBS, a first modulation coding level or a first physical resource block (PRB) size.

For example, the first transmission format only includes one of the first modulation manner, the first code rate, the first TBS, the first modulation coding level and the first PRB size.

For example, the first transmission format may include the first modulation manner and the first code rate.

For example, the first transmission format may include the first modulation manner and the first code rate, and further include at least one of the first TBS, the first modulation coding level or the first PRB size.

For example, the first transmission format may include the first modulation coding level, and further include at least one of the first TBS, the first modulation coding level or the first PRB size.

For example, the first transmission format may include the first TBS and the first PRB size.

In at least one embodiment, the terminal device determines the first transmission format according to at least one of the followings:
  pre-configured multiple transmission formats, and each pre-configured transmission format may include at least one of a modulation manner, a code rate, a TBS, a modulation coding level or a PRB size;
  a data amount of the data to be sent;
  a present downlink quality;
  a quality of service (QoS) requirement of the data to be sent, such as a delay requirement;
  a bearer of the data to be sent;
  a data stream of the data to be sent;
  a pre-configured position of an uplink available resource;
  a pre-configured size of an uplink available resource, a pre-configured reference code rate, and the number of bits capable of being carried by a unit uplink resource; or
  a maximum available transmit power of the terminal device for transmission of the data to be sent.

In at least one embodiment, the terminal device receives configuration information of the network device, and the configuration information is to indicate at least one of the followings:
  the pre-configured multiple transmission formats;
  the pre-configured position of the uplink available resource;
  the pre-configured size of the uplink available resource; or
  the pre-configured reference code rate of the uplink data.

In at least one embodiment, the terminal device receives the configuration information sent by the network device via Wireless Resource Control (RRC) layer signaling, Media Access Control (MAC) layer signaling or physical layer signaling.

In order to understand the disclosure more clearly, the manner in which the terminal device determines the first transmission format will be described below in combination with several implementations.

In one implementation, at least one TBS is determined according to pre-configured multiple TBSs and the data amount of the data to be sent, and the at least one TBS includes a TBS, more than the data amount of the data to be sent, in the multiple TBSs. A minimum TBS of the at least one TBS is determined as the first TBS included in the first transmission format.

In one implementation, at least one TBS is determined according to pre-configured multiple TBSs and the data amount of the data to be sent and the at least one TBS includes a TBS, less than the data amount of the data to be sent, in the multiple TBSs. A maximum TBS of the at least one TBS is determined as a first TBS included in the first transmission format.

In one implementation, the first TBS included in the first transmission format is determined according to the pre-configured size of the uplink available resource, the pre-configured reference code rate, and the number of bits capable of being carried by a unit uplink resource.

The unit uplink resource may be, but not limited to, a resource size determined by a unit time-domain resource, a unit frequency-domain resource and a unit space-domain resource.

The unit time-domain resource may be a frame, a subframe, a time slot or a symbol. The size of the uplink available resource may include the number of unit time-domain resources, such as the number of frames, the number of subframes, the number of time slots or the number of symbols.

The unit frequency-domain resource may be a Resource Block (RB) or an RB group, etc. The size of the uplink available resource may include the number of unit frequency-domain resources, such as the number of RBs or the number of RB groups.

The unit space-domain resource may be a transmitting beam and the like. The size of the uplink available resource may include the number of unit space-domain resources, such as the number of transmitting beams.

In at least one embodiment, the number of bits capable of being carried by the unit uplink resource includes the number of bits that can be carried by a unit uplink resource corresponding to each of the multiple modulation manners. The terminal device determines a TBS corresponding to each modulation manner according to the size of the uplink available resource, the reference code rate and the number of bits that can be carried by the unit uplink resource corresponding to each modulation manner. According to TBSs corresponding to the multiple modulation manners, the terminal device determines a first TBS included in the first transmission format, and determines a first modulation manner or a first modulation coding level included in the first transmission format.

For example, a maximum TBS of the TBSs corresponding to the multiple modulation manners is determined as the first TBS.

A modulation manner corresponding to the first TBS is determined as the first modulation manner, or a modulation coding level to which the modulation manner corresponding to the first TBS belongs is determined as the first modulation coding level.

For example, at least one TBS that is more than the data amount of the data to be sent is determined from the TBSs corresponding to the multiple modulation manners. A minimum TBS of the at least one TBS is determined as the first TBS. A modulation manner corresponding to the first TBS is determined as the first modulation manner, or a modulation coding level to which the modulation manner corresponding to the first TBS belongs is determined as the first modulation coding level.

For example, a transmit power at each TBS corresponding to respective modulation manner is calculated. According to the transmit power at the TBS corresponding to each modulation manner, the first TBS is determined and the first modulation manner or the first modulation coding level is determined.

In at least one embodiment, there may be multiple implementations for determining the first TBS and determining the first modulation manner or the first modulation coding level according to the transmit power at the TBS corresponding to each modulation manner.

For example, a transmit power corresponding to the first modulation manner or a modulation manner included in the first modulation coding level is a minimum transmit power of transmit powers corresponding to the multiple modulation manners; and/or the transmit power corresponding to the first modulation manner or the modulation manner included in the first modulation coding level is less than a maximum available transmit power of the terminal device for transmission of the data to be sent.

For example, according to the transmit power at the TBS corresponding to each modulation manner and the TBS corresponding to each modulation manner, the first TBS is determined and the first modulation manner or the first modulation coding level is determined.

Specifically, a combination of transmit power and TBS, both of which are within a range, may be selected; or the transmit power and the TBS may be converted in the same unit and weighed processing, and a combination of the transmit power and the TBS may be selected according to the obtained value.

In one implementation, the terminal device determines the first transmission format according to a present downlink quality and a first correspondence. The first correspondence is to indicate a correspondence between multiple transmission formats and multiple downlink quality ranges.

In one implementation, the terminal device determines the first transmission format according to a data stream of the data to be sent and a second correspondence. The second correspondence is to indicate a correspondence between multiple transmission formats and multiple data streams.

In one implementation, the terminal device determines the first transmission format according to a bearer of the data to be sent and a third correspondence. The third correspondence is to indicate a correspondence between multiple transmission formats and multiple bearers.

In one implementation, the terminal device determines the first transmission format according to a pre-configured position of the available resource for transmitting uplink data and a fourth correspondence. The fourth correspondence is to indicate a correspondence between multiple transmission formats and multiple position ranges of uplink resources.

In one implementation, the terminal device determines the first transmission format according to a QoS requirement of the data to be sent and a QoS requirement capable of being met by each of the multiple transmission formats.

In at least one embodiment in the disclosure, the terminal device determines a first TBS included in the first transmission format.

According to the first TBS, a transmit power corresponding to each of the pre-configured multiple modulation manners is calculated.

According to the transmit power corresponding to each modulation manner, a first modulation manner or a first modulation coding level included in the first transmission format is determined.

In at least one embodiment, a transmit power corresponding to the first modulation manner or a modulation manner included in the first modulation coding level is a minimum transmit power of transmit powers corresponding to the multiple modulation manners; and/or, the transmit power corresponding to the first modulation manner or the modulation manner included in the first modulation coding level is less than a maximum available transmit power of the terminal device for transmission of the data to be sent.

At 220, the terminal device sends the data to be sent to a network device according to the first transmission format.

In at least one embodiment, the terminal device sends first indication information to the network device. The first indication information is to indicate the first transmission format.

In one implementation, the terminal device sends the first indication information to the network device via a data channel for transmission of the data to be sent.

In another implementation, the terminal device sends the first indication information to the network device on a pre-configured resource for transmission of indication information of a transmission format.

In at least one embodiment, the pre-configured resource is a dedicated resource of the terminal device.

Alternatively, the pre-configured resource is a resource shared by multiple terminal devices, and the indication information further carries an identifier of the terminal device.

Figure 3:
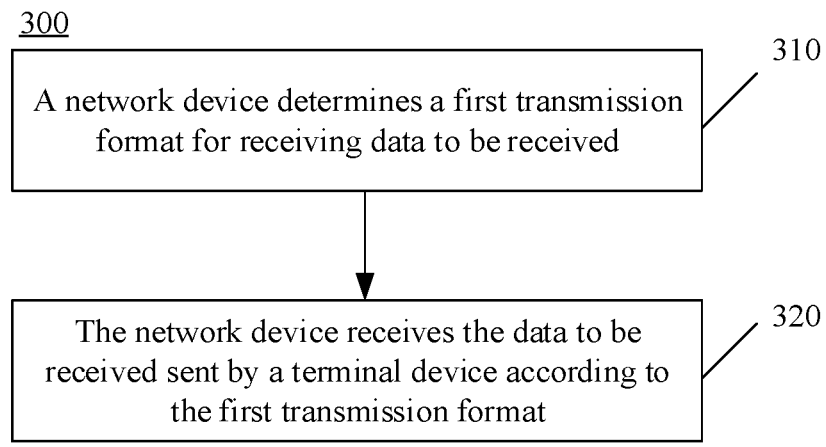
FIG. 3 illustrates a schematic flowchart diagram of a wireless communication method according to an embodiment of the disclosure.

FIG. 3 illustrates a schematic flowchart of a wireless communication method 300 according to an embodiment of the disclosure. As illustrated in FIG. 3, the method 300 may include the following operations.

At 310, a network device determines a first transmission format for receiving data to be received.

In at least one embodiment, the terminal device may be a terminal device in an inactive state.

In at least one embodiment, the first transmission format includes at least one of the followings: a first modulation manner, a first code rate, a first TBS, a first modulation coding level, or a first PRB size.

In at least one embodiment, the network device may determine the first transmission format according to a resource position for carrying the data to be received.

In at least one embodiment, the network device receives first indication information sent by the network device, and the first indication information is to indicate the first transmission format. The network device determines the first transmission format according to the first indication information.

In one implementation, the network device receives the first indication information sent by the terminal device via a data channel for transmission of the data to be received.

In one implementation manner, the network device receives the first indication information sent by the terminal device on a pre-configured resource for transmission of indication information of a transmission format.

In at least one embodiment, the pre-configured resource is a dedicated resource of the terminal device.

Alternatively, the pre-configured resource is a resource shared by multiple terminal devices, and the indication information further carries an identifier of the terminal device.

At 320, the network device receives the data to be received sent by a terminal device according to the first transmission format.

In at least one embodiment, the network device sends configuration information to enable a receiver to select a transmission format for transmitting uplink data. The receiver includes the terminal device. The configuration information is to indicate at least one of the followings:
pre-configured multiple transmission formats;
a pre-configured position of an uplink available resource;
a pre-configured size of the uplink available resource; or
a pre-configured reference code rate of the uplink data.

Therefore, in this embodiment of the disclosure, the terminal device determines the first transmission format for sending the data.

The terminal device sends the data to the network device according to the first transmission format.

The wireless communication method according to the embodiments of the disclosure has been described above in combination with FIG. 1 to FIG. 3. A device for implementing the wireless communication method in the embodiments of the disclosure will be described below in combination with FIG. 4 to FIG. 7.

Figure 4:
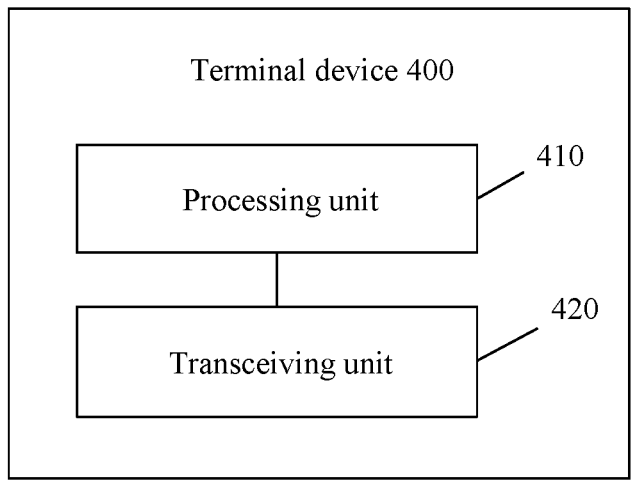
FIG. 4 illustrates a schematic block diagram of a terminal device according to an embodiment of the disclosure.

FIG. 4 illustrates a schematic block diagram of a terminal device 400 according to an embodiment of the disclosure. As illustrated in FIG. 4, the terminal device 400 may include a processing unit 410 and a transceiving unit 420.

The processing unit 410 is configured to determine a first transmission format for sending data to be sent. The transceiving unit 420 is configured to send the data to be sent to a network device according to the first transmission format.

In at least one embodiment, the first transmission format includes at least one of the followings: a first modulation manner, a first code rate, a first TBS, a first modulation coding level, or a first PRB size.

In at least one embodiment, the transceiving unit 420 is further configured to send first indication information to the network device. The first indication information is to indicate the first transmission format.

In at least one embodiment, the transceiving unit 420 is further configured to send the first indication information to the network device via a data channel for transmission of the data to be sent.

In at least one embodiment, the transceiving unit 420 is further configured to send the first indication information to the network device on a pre-configured resource for transmission of indication information of a transmission format.

In at least one embodiment, the pre-configured resource is a dedicated resource of the terminal device.

Alternatively, the pre-configured resource is a resource shared by multiple terminal devices, and the indication information further carries an identifier of the terminal device.

In at least one embodiment, the processing unit 410 is further configured to determine the first transmission format according to at least one of the followings:
pre-configured multiple transmission formats;
a data amount of the data to be sent;
a present downlink quality;
a QoS requirement of the data to be sent;
a bearer of the data to be sent;
a data stream of the data to be sent;
a pre-configured position of an uplink available resource;
a pre-configured size of an uplink available resource, a pre-configured reference code rate, and the number of bits capable of being carried by a unit uplink resource; and
a maximum available transmit power of the terminal device for transmission of the data to be sent.

In at least one embodiment, the processing unit 410 is further configured to determine at least one TBS according to pre-configured multiple TBSs and the data amount of the data to be sent, and determine a minimum TBS of the at least one TBS as a first TBS included in the first transmission format. The at least one TBS includes a TBS, more than the data amount of the data to be sent, in the multiple TBSs.

In at least one embodiment, the processing unit 410 is further configured to determine at least one TBS according to pre-configured multiple TBSs and the data amount of the data to be sent, and determine a maximum TBS of the at least one TBS as a first TBS included in the first transmission format. The at least one TBS includes a TBS, less than the data amount of the data to be sent, in the multiple TBSs;

In at least one embodiment, the processing unit 410 is further configured to determine a first TBS included in the first transmission format according to the pre-configured size of the uplink available resource, the pre-configured reference code rate, and the number of bits capable of being carried by the unit uplink resource.

In at least one embodiment, the processing unit 410 is further configured to determine a first TBS included in the first transmission format; calculate, according to the first TBS, a transmit power corresponding to each of the pre-configured multiple modulation manners; and determine, according to the transmit power corresponding to each modulation manner, a first modulation manner or a first modulation coding level included in the first transmission format.

In at least one embodiment, the transmit power corresponding to the first modulation manner or the modulation manner included in the first modulation coding level may be at least one of the followings. The transmit power corresponding to the first modulation manner or the modulation manner included in the first modulation coding level is a minimum transmit power of transmit powers corresponding to the multiple modulation manners, or the transmit power corresponding to the first modulation manner or the modulation manner included in the first modulation coding level is less than a maximum available transmit power of the terminal device for transmission of the data to be sent.

In at least one embodiment, the number of bits capable of being carried by the unit uplink resource includes the number of bits capable of being carried by a unit uplink resource corresponding to each of the multiple modulation manners.

The processing unit 410 is further configured to determine a TBS corresponding to each modulation manner according to the size of the uplink available resource, the reference code rate and the number of bits capable of being carried by the unit uplink resource corresponding to each modulation manner, determine, according to TBSs corresponding to the multiple modulation manners, a first TBS included in the first transmission format, and determine a first modulation manner or a first modulation coding level included in the first transmission format.

In at least one embodiment, the processing unit 410 is further configured to determine a maximum TBS of the TBSs corresponding to the multiple modulation manners as the first TBS; and determine a modulation manner corresponding to the first TBS as the first modulation manner, or determine a modulation coding level to which the modulation manner corresponding to the first TBS belongs as the first modulation coding level.

In at least one embodiment, the processing unit 410 is further configured to determine at least one TBS more than the data amount of the data to be sent from the TBSs corresponding to the multiple modulation manners, determine a minimum TBS of the at least one TBS as the first TBS, and determine a modulation manner corresponding to the first TBS as the first modulation manner, or determine a modulation coding level to which the modulation manner corresponding to the first TBS belongs as the first modulation coding level.

In at least one embodiment, the processing unit 410 is further configured to calculate a transmit power at a TBS corresponding to each modulation manner; and determine, according to the transmit power at the TBS corresponding to each modulation manner, the first TBS, and determine the first modulation manner or the first modulation coding level.

In at least one embodiment, the transmit power corresponding to the first modulation manner or the modulation manner included in the first modulation coding level is a minimum transmit power in transmit powers corresponding to the multiple modulation manners; and/or, the transmit power corresponding to the first modulation manner or the modulation manner included in the first modulation coding level is less than a maximum available transmit power of the terminal device for transmission of the data to be sent.

In at least one embodiment, the processing unit 410 is further configured to determine, according to the transmit power at the TBS corresponding to each modulation manner and the TBS corresponding to each modulation manner, the first TBS, and determine the first modulation manner or the first modulation coding level.

In at least one embodiment, the processing unit 410 is further configured to determine the first transmission format according to a present downlink quality and a first correspondence. The first correspondence is to indicate a correspondence between multiple transmission formats and multiple downlink quality ranges.

In at least one embodiment, the processing unit 410 is further configured to determine the first transmission format according to a data stream of the data to be sent and a second correspondence. The second correspondence is to indicate a correspondence between multiple transmission formats and multiple data streams.

In at least one embodiment, the processing unit 410 is further configured to determine the first transmission format according to a bearer of the data to be sent and a third correspondence. The third correspondence is to indicate a correspondence between multiple transmission formats and multiple bearers.

In at least one embodiment, the processing unit 410 is further configured to determine the first transmission format according to a pre-configured position of the available resource for transmitting uplink data and a fourth correspondence. The fourth correspondence is to indicate a correspondence between multiple transmission formats and multiple position ranges of uplink resources.

In at least one embodiment, the processing unit 410 is further configured to determine the first transmission format according to a QoS requirement of the data to be sent and a QoS requirement capable of being met by each of the multiple transmission formats.

In at least one embodiment, the transceiving unit 420 is further configured to receive configuration information of the network device. The configuration information is used for indicating at least one of the followings:
  the pre-configured multiple transmission formats;
  the pre-configured position of the uplink available resource;
  the pre-configured size of the uplink available resource; or
  the pre-configured reference code rate of the uplink data.

In at least one embodiment, the transceiving unit 420 is further configured to receive the configuration information sent by the network device via RRC layer signaling, MAC layer signaling or physical layer signaling.

In at least one embodiment, the terminal device 400 is used in grant free transmission.

In at least one embodiment, the terminal device 400 is a terminal device in an inactive state.

The terminal device 400 may correspond to the terminal device in the method 200 and may implement corresponding functions implemented by the terminal device in the method 200, which will not be repeated herein for briefness.

Figure 5:
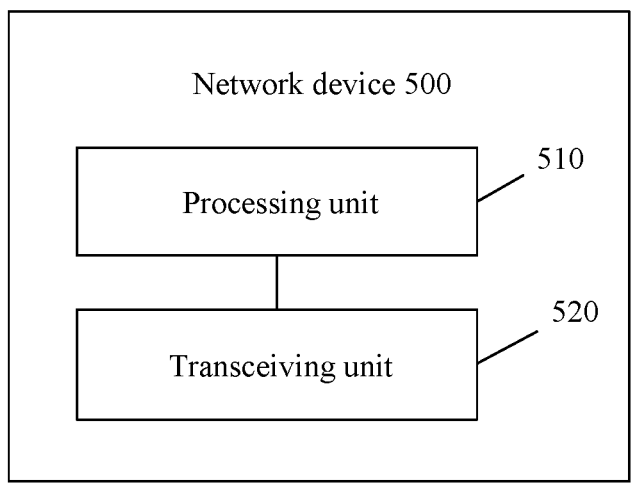
FIG. 5 illustrates a schematic block diagram of a network device according to an embodiment of the disclosure.

FIG. 5 illustrates a schematic block diagram of a network device 500 according to an embodiment of the disclosure. As illustrated in FIG. 5, the network device 500 may include a processing unit 510 and a transceiving unit 520.

The processing unit 510 is configured to determine a first transmission format for receiving data to be received. The transceiving unit 520 is configured to receive the data to be received sent by a terminal device according to the first transmission format.

In at least one embodiment, the first transmission format includes at least one of the followings: a first modulation manner, a first code rate, a first TBS, a first modulation coding level, or a first PRB size.

In at least one embodiment, the transceiving unit 520 is further configured to receive first indication information sent by the terminal device. The first indication information is used for indicating the first transmission format.

The processing unit 510 is further configured to determine the first transmission format according to the first indication information.

In at least one embodiment, the transceiving unit 520 is further configured to receive the first indication information sent by the terminal device via a data channel for transmission of the data to be received.

In at least one embodiment, the transceiving unit 520 is further configured to receive the first indication information sent by the terminal device on a pre-configured resource for transmission of indication information of a transmission format.

In at least one embodiment, the pre-configured resource is a dedicated resource of the terminal device.

Alternatively, the pre-configured resource is a resource shared by multiple terminal devices, and the indication information further carries an identifier of the terminal device.

In at least one embodiment, the transceiving unit 520 is further configured to send configuration information, to enable a receiver to select a transmission format for transmitting uplink data. The receiver includes the terminal device. The configuration information is used for indicating at least one of the followings:
  pre-configured multiple transmission formats;
  a pre-configured position of an uplink available resource;
  a pre-configured size of the uplink available resource; or
  a pre-configured reference code rate of the uplink data.

In at least one embodiment, the network device is used in grant free transmission.

In at least one embodiment, the terminal device is a terminal device in an inactive state.

The network device 500 may correspond to the network device in the method 300 and may implement corresponding functions implemented by the network device in the method 300, which will not be repeated herein for briefness.

Figure 6:
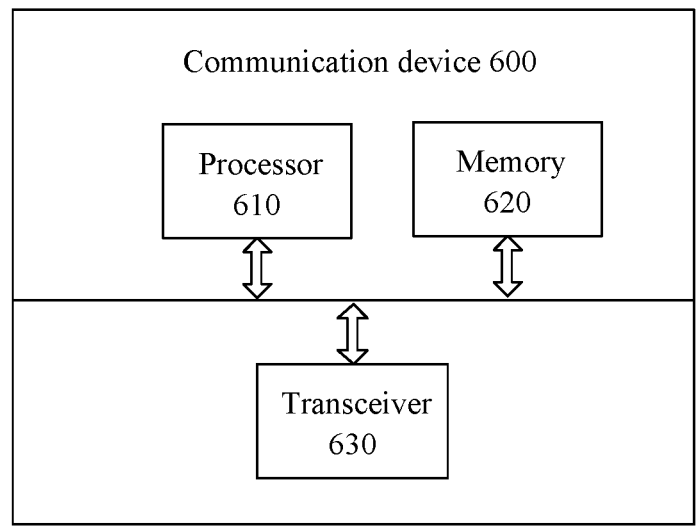
FIG. 6 illustrates a schematic block diagram of a communication device according to an embodiment of the disclosure.

FIG. 6 illustrates a schematic block diagram of a communication device 600 according to an embodiment of the disclosure. As illustrated in FIG. 6, the device 600 may include a processor 610 and a memory 620. The memory 620 may store a program code. The processor 610 may execute the program code stored in the memory 620.

In at least one embodiment, as illustrated in FIG. 6, the device 600 may include a transceiver 630. The processor 610 may control the transceiver 630 for external communication.

In at least one embodiment, the processor 610 may invoke the program code stored in the memory 620 to execute the corresponding operations of the terminal device in the method 200 illustrated in FIG. 2, which will not be repeated herein for briefness.

In at least one embodiment, the processor 610 may invoke the program code stored in the memory 620 to execute the corresponding operations of the network device in the method 300 illustrated in FIG. 3, which will not be repeated herein for briefness.

Figure 7:
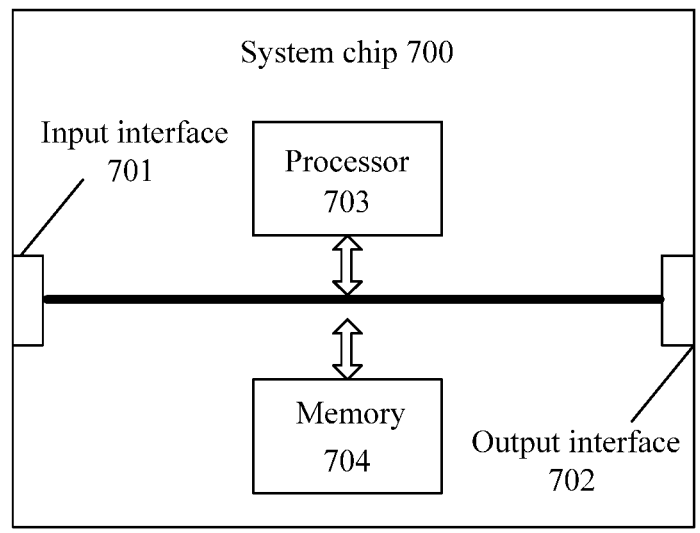
FIG. 7 illustrates a schematic block diagram of a system chip according to an embodiment of the disclosure.

FIG. 7 illustrates a schematic diagram of a system chip according to an embodiment of the disclosure. The system chip 700 in FIG. 7 may include an input interface 701, an output interface 702, a processor 703 and a memory 704 that are connected via an internal connection line. The processor 703 is configured to execute a code in the memory 704.

In at least one embodiment, when the code is executed, the processor 703 implements the operations executed by the terminal device in the method 200 illustrated in FIG. 2, which will not be repeated herein for briefness.

In at least one embodiment, when the code is executed, the processor 703 implements the operations executed by the network device in the method 300 illustrated in FIG. 3, which will not be repeated herein for briefness.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A wireless communication method, comprising:
   determining, by a terminal device, a first transmission format for sending data to be sent; and
   sending, by the terminal device according to the first transmission format, the data to a network device;
   wherein determining, by the terminal device, the first transmission format for sending the data to be sent comprises:
   determining at least one transport block size (TBS) according to pre-configured multiple TBSs and a data amount of the data to be sent, wherein the at least one TBS comprises a TBS, more than the data amount of the data to be sent, in the multiple TBSs; and
   determining a minimum TBS of the at least one TBS as a first TBS comprised in the first transmission format.

2. The method of claim 1, wherein the first transmission format further comprises at least one of the followings:
   a first modulation manner, a first code rate, a first modulation coding level, or a first physical resource block (PRB) size.

3. The method of claim 1, further comprising:
   sending, by the terminal device, first indication information to the network device, wherein the first indication information is used to indicate the first transmission format.

4. The method of claim 1, wherein determining, by the terminal device, the first transmission format for sending the data to be sent further comprises:
   determining, by the terminal device, the first transmission format according to at least one of the following:
   pre-configured multiple transmission formats;
   a present downlink quality;
   a quality of service (QoS) requirement of the data to be sent;
   a bearer of the data to be sent;
   a data stream of the data to be sent;
   a pre-configured position of an uplink available resource;
   a pre-configured size of an uplink available resource, a pre-configured reference code rate, and a number of bits capable of being carried by a unit uplink resource; or
   a maximum available transmit power of the terminal device for transmission of the data to be sent.

5. The method of claim 1, wherein determining, by the terminal device, the first transmission format for sending the data to be sent further comprises:
   determining the first TBS comprised in the first transmission format according to a pre-configured size of an uplink available resource, a pre-configured reference code rate and a number of bits capable of being carried by a unit uplink resource.

6. The method of claim 1, wherein determining, by the terminal device, the first transmission format for sending the data to be sent further comprises:
   determining the first TBS comprised in the first transmission format;

calculating, according to the first TBS, a transmit power corresponding to each of pre-configured multiple modulation manners; and determining, according to the transmit power corresponding to each modulation manner, a first modulation manner or a first modulation coding level comprised in the first transmission format.

7. The method of claim 1, wherein determining, by the terminal device, the first transmission format for sending the data to be sent further comprises:

determining at least one TBS according to the pre-configured multiple TBSs and the data amount of the data to be sent, wherein the at least one TBS comprises a TBS, less than the data amount of the data to be sent, in the multiple TBSs; and determining a maximum TBS of the at least one TBS as the first TBS comprised in the first transmission format.

8. A terminal device, comprising:

a processor, configured to determine a first transmission format for sending data to be sent; and a transceiver, configured to send the data to a network device according to the first transmission format;

wherein the processor is further configured to:

determine at least one transport block size (TBS) according to pre-configured multiple TBSs and a data amount of the data to be sent, wherein the at least one TBS comprises a TBS, more than the data amount of the data to be sent, in the multiple TBSs; and determine a minimum TBS of the at least one TBS as a first TBS comprised in the first transmission format.

9. The terminal device of claim 8, wherein the first transmission format further comprises at least one of the followings:

a first modulation manner, a first code rate, a first modulation coding level, or a first physical resource block (PRB) size.

10. The terminal device of claim 8, wherein the transceiver is further configured to:

send first indication information to the network device, wherein the first indication information is to indicate the first transmission format.

11. The terminal device of claim 8, wherein the processor is further configured to:

determine the first transmission format according to at least one of the followings:
pre-configured multiple transmission formats;
a present downlink quality;
a Quality of Service (QoS) requirement of the data to be sent;
a bearer of the data to be sent;
a data stream of the data to be sent;
a pre-configured position of an uplink available resource;
a pre-configured size of an uplink available resource, a pre-configured reference code rate, and a number of bits capable of being carried by a unit uplink resource; and
a maximum available transmit power of the terminal device for transmission of the data to be sent.

12. The terminal device of claim 11, wherein the transceiver is further configured to:

receive configuration information of the network device, wherein the configuration information is to indicate at least one of the followings:
the pre-configured multiple transmission formats;
the pre-configured position of the uplink available resource;
the pre-configured size of the uplink available resource; or
the pre-configured reference code rate of the uplink data.

13. The terminal device of claim 8, wherein the processor is further configured to:

determine at least one TBS according to the pre-configured multiple TBSs and the data amount of the data to be sent, wherein the at least one TBS comprises a TBS, less than the data amount of the data to be sent, in the multiple TBSs; and determine a maximum TBS of the at least one TBS as the first TBS comprised in the first transmission format.

14. The terminal device of claim 8, wherein the processor is further configured to:

determine, according to a pre-configured size of an uplink available resource, a pre-configured reference code rate, and a number of bits capable of being carried by a unit uplink resource, the first TBS comprised in the first transmission format.

15. The terminal device of claim 8, wherein the processor is further configured to:

determine the first TBS comprised in the first transmission format;

calculate, according to the first TBS, a transmit power corresponding to each of the pre-configured multiple modulation manners; and determine, according to the transmit power corresponding to each modulation manner, a first modulation manner or a first modulation coding level comprised in the first transmission format.

16. The terminal device of claim 8, wherein the processor is further configured to:

determine the first transmission format according to a data stream of the data to be sent and a second correspondence, wherein the second correspondence is to indicate a correspondence between multiple transmission formats and multiple data streams.

17. The terminal device of claim 8, wherein the processor is further configured to:

determine the first transmission format according to a bearer of the data to be sent and a third correspondence, wherein the third correspondence is to indicate a correspondence between multiple transmission formats and multiple bearers.

18. The terminal device of claim 8, wherein the processor is further configured to:

determine the first transmission format according to a pre-configured position of an available resource for transmitting uplink data and a fourth correspondence, wherein the fourth correspondence is to indicate a correspondence between multiple transmission formats and multiple position ranges of uplink resources.

19. The terminal device of claim 8, wherein the processor is further configured to:

determine the first transmission format according to a QoS requirement of the data to be sent and a QoS requirement capable of being met by each of the multiple transmission formats.

* * * * *